United States Patent [19]
Carnwath

[11] Patent Number: 5,950,354
[45] Date of Patent: Sep. 14, 1999

[54] BI-DIRECTIONAL TUNNEL RAT TRAP

[76] Inventor: James R. Carnwath, 12024 86th Ave., NE. Kirkland, Wash. 98034

[21] Appl. No.: 08/957,453

[22] Filed: Oct. 24, 1997

[51] Int. Cl.[6] .......................... A01M 23/16; A01M 23/30
[52] U.S. Cl. .................................................. 43/81
[58] Field of Search ................................ 43/78, 81.5, 81, 43/82, 84

[56] References Cited

U.S. PATENT DOCUMENTS

| | | | |
|---|---|---|---|
| 1,799,149 | 4/1931 | Burnley | 43/81 |
| 2,684,553 | 7/1954 | Schroeder | 43/81 |
| 3,100,361 | 8/1963 | Wanless et al. | 43/81 |
| 3,950,884 | 4/1976 | Desrosiers | 43/81 |

*Primary Examiner*—Robert P. Swiatek
*Attorney, Agent, or Firm*—Robert W. Jenny

[57] ABSTRACT

The tunnel trap is for use on paths normally used by rats and has two trips operated sequentially. A rat entering either end of the tunnel activates one trip and advances into the tunnel, activating the other trip, releasing the spring driven striker. This procedure and specific proportioning of elements of the trap assures that regardless of which direction the rat is passing through the tunnel it will be trapped and killed. In a mechanical embodiment the striker is held and released by a latch which is activated by a plunger rod which is, in turn, held and released by two latches, one activated by one trip pad in the tunnel and the other by a second trip pad. Each pad extends from near one end of the tunnel toward its longitudinal center. The pad ends toward the center are a distance apart related to the size range and physiques of the rats to be trapped. This distance is such that when the forefeet of a rat press on a second pad the striker moving in the lengthwise center of the tunnel will strike the rat in the vital zone between the base of its skull and the lower extremity of its lungs.

2 Claims, 2 Drawing Sheets

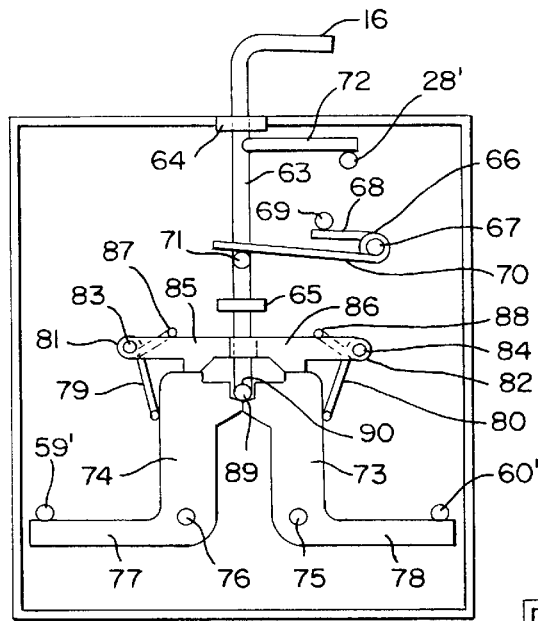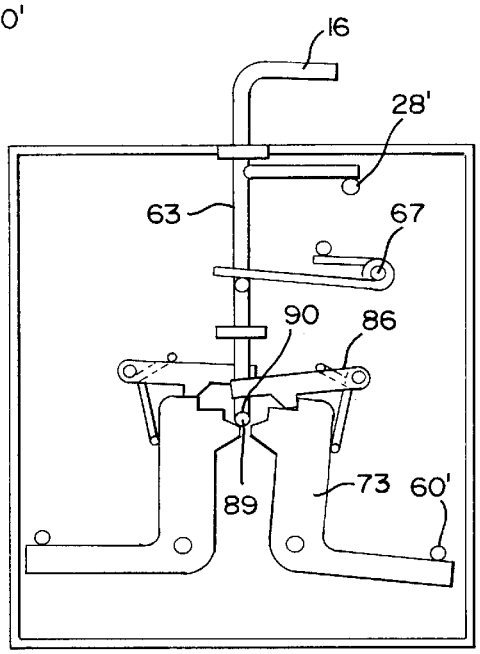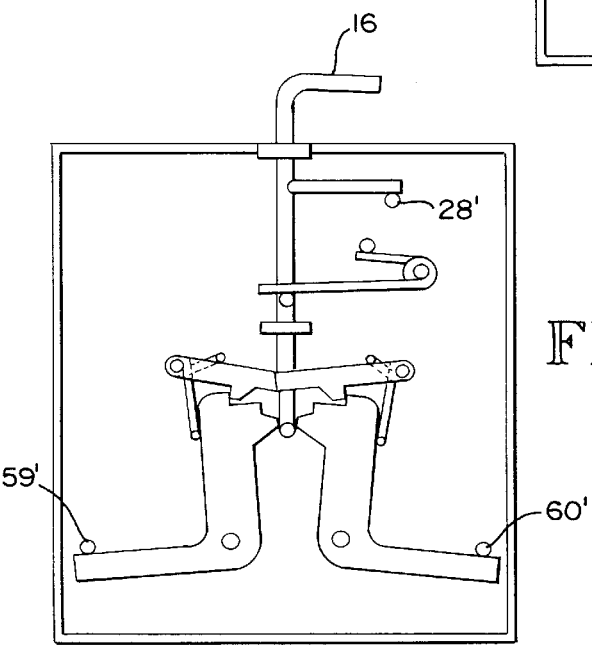

BI-DIRECTIONAL TUNNEL RAT TRAP

BACKGROUND OF THE INVENTION

1. Field

The subject invention is in the field of animal traps, particularly traps for rats and more particularly baitless rat traps. Still more particularly it is in the field of baitless all mechanical rat trips of the tunnel type. Such traps are placed in paths which the rats to be trapped are highly likely to take, such as on a floor next to a wall.

2. Prior Art

There is much prior art in this more particular field, patented and not patented. Some such traps capture the rats alive. In others the intent is to kill the trapped rat instantly, hopefully not catching it injured to die slowly if at all. Killing the rat instantly is more humane and removing merely injured rats from the trap can be difficult and is unpleasant at best. However, experience has shown that bi-directional mechanical traps do not reliably kill trapped rats instantly. Such killing requires that the rat be struck hard in the so-called vital zone between the base of its skull and the lower extremity of its lungs. Accordingly, the primary objective of the subject invention is to provide a mechanical bi-directional rat trap which reliably kills the trapped rat. A second objective is that the trap be such that removal of the trapped rat is simple and does not require handling the rat. A third objective is that setting the trap presents minimal risk of injury to the user and does not require high finger strength or manual dexterity. Another objective is that the trap be sensitive to the weight of animals passing through it so that it only traps animals weighing more than a predetermined amount.

SUMMARY OF THE INVENTION

The subject invention is a bi-directional tunnel rat trap having a high kill probability. To achieve the high probability the trap has a double trip. The trips are activated in sequence and assure that the rat (or other animal to be trapped) is positioned at the instant the trap is sprung so that it is struck by a striker in the so-called vital zone starting at the base of its skull and extending to the lower extremity of its lungs. The double tripping is essential for successful operation of a bi-directional trap and allows the head and forepaws of the rat to pass the plane of action of the striker before the striker is released. The tripping can be done electromechanically or mechanically, the choice depending largely on the circumstances of use of the trap.

In a mechanical embodiment the tunnel floor comprises two trip plates. One end of each trip plate is pivoted on a horizontal axis near one end of the tunnel. The other ends of the trip plates are supported by springs. The length of each trip plate is in a range of 0.3 to 0.5 of the tunnel length with 0.4 preferred. The spring supported ends engage a trip mechanism which comprises two latches which engage a spring loaded trip plunger. When the two plunger latches are released the plunger moves to actuate a trip latch to allow a spring loaded striker to strike the rat in the tunnel. The two plunger latches are released in sequence. One plunger latch is released when a rat moves onto a trip plate as it enters the tunnel. The second plunger latch is released when the rat advances to step on the other trip plate and the striker strikes the rat. The plunger latches are each held in the release mode by a latch latch until the latch latches are released during resetting of the trap. The distance between the spring supported ends of the trip plates is related to the size range and physiques of the animals to be trapped. The spring support of the trap plates makes the trap sensitive to the weight of the animals passing through the trap. This procedure is valid no matter which end of the tunnel the rat enters. The dual latching and appropriate proportioning of the trap elements assures that regardless of which way the rat is moving through the tunnel it is struck in the vital zone beginning at the base of its skull and ending at the lower end of its lungs. The striker is U-shaped and its ends are pivoted on the sides of the tunnel with the pivots located so that the cross portion of the striker (the striker bar) moves essentially vertically as it enters the strike zone. A coiled torsion spring is mounted on a rod near the top of the tunnel and an arm on the spring engages one of the side portions of the striker to activate the striker when the trip latch is released. The striker is reset by a reset lever. The lever is also U-shaped, pivoted on the same pivots as the striker and extending out of the end of the tunnel nearest to the pivots. One leg of the lever extends beyond a pivot and engages a side portion (leg) of the striker. To reset the striker the lever is moved downward until the striker is re-engaged by the trip latch and then moved upward so that it does not block the path through the tunnel. The trip mechanism is reset by raising the plunger so that a projection on the plunger engages extensions on the latch latches to move them so that the plunger latches can be in a position to restrain the plunger when it is allowed to move downward to be re-engaged by the plunger latches.

In electromechanical embodiments one or both trips may be electrical or electronic leading to mechanical release of the striker. The tripping sequence depends on sensing the progress of the rat through the trap so that the trap is sprung when the rat is positioned to be struck in the vital zone. The trips which ultimately spring the trap are equidistant from the plane of action of the striker bar and the distance between them is in a range of $\frac{1}{8}$ to $\frac{1}{4}$ of the body lengths of the animals to be trapped. The sensing may be done optically such as by interruption of a beam of radiation or thermally or by a pressure sensitive switch. The sequential tripping is accomplished by providing means which hold the first trip tripped until the second trip is tripped and the trap is sprung. Such means can be electromechanical or electronic and are considered to be within the capabilities of persons having ordinary skill in the art, the invention lying in the sequential tripping in a tunnel trap and not in the means.

The subject invention is described in more detail below with reference to the attached drawings.

BRIEF DESCRIPTION OF THE DRAWINGS

FIG. 4 is a schematic illustration of the trip mechanism with the trap set.

FIG. 5 is a schematic illustration of the trip mechanism with one plunger latch in its release position and held in that position by a latch latch.

FIG. 6 is a schematic illustration of the trip mechanism with both plunger latches in their release positions and held in those positions by the latch latches and the plunger displaced downward to trip the trap.

DETAILED DESCRIPTION OF THE INVENTION

Figure 1:
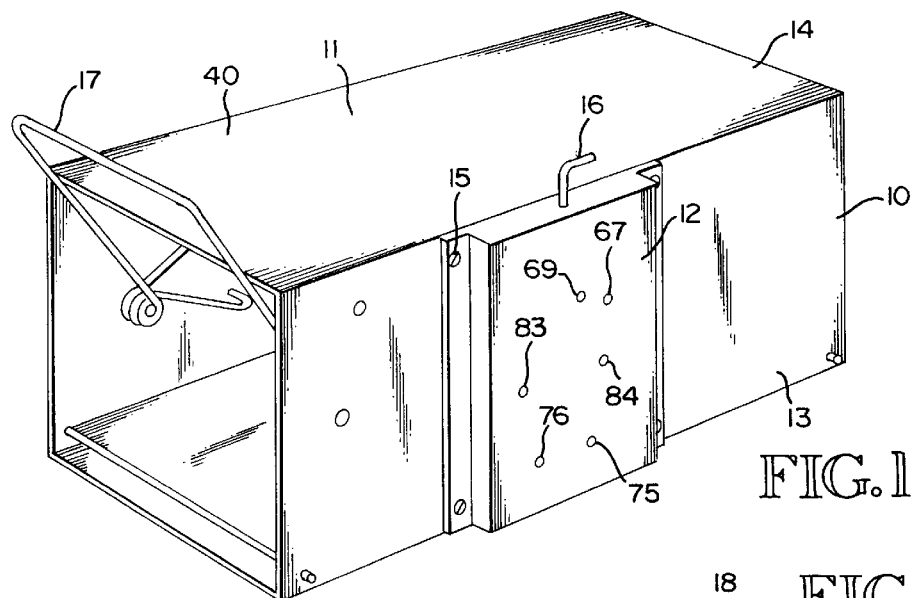
FIG. 1 is a general view of a preferred embodiment of the subject invention.

The subject invention is a bi-directional tunnel rat trap which may be mechanical or electromechanical. A preferred mechanical embodiment of the invention is shown in FIG. 1. Trap 10 comprises a tunnel assembly 11 and a trip mechanism assembly 12 attached to side 13 of tunnel 14 by fasteners, fastener 15 being typical. As explained in more detail below, the trap is set by (1) lifting trip plunger 16 as far as it will go and then releasing it and (2) moving handle 17 down as far as it will go and then up to the position shown.

Figure 2:
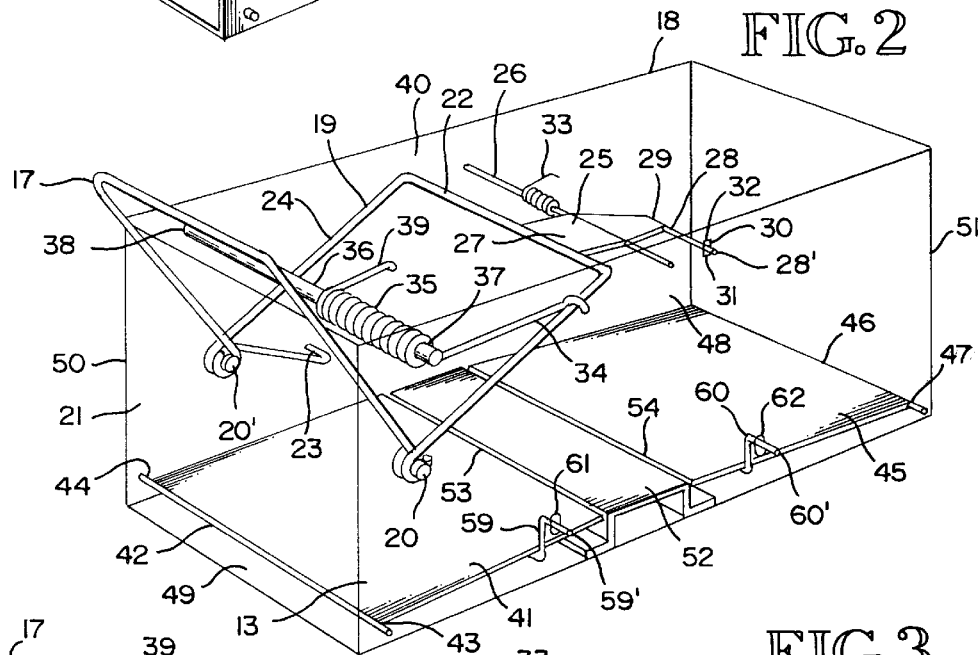
FIG. 2 illustrates the tunnel assembly with the casing transparent.

FIG. 2 is a schematic illustration of the tunnel assembly with the casing 18 transparent. Handle 17 and striker 19 are pivotally mounted on stub shafts 20 and 20' attached to sides 13 and 21 respectively. The stub shafts are located such that when the striker is horizontal striker bar 22 is moving essentially vertically as it strikes a rat. Extension 23 on the handle engages side portion 24 of the striker when the handle is used to reset the striker. The striker is held reset by striker latch 25 which is pivotally mounted on shaft 26. End 27 of the striker latch engages the striker bar. Pin 28 extends from end 29 of the striker latch through slot 30 in side 13. Rotation of the striker latch is limited by contacts between pin 28 and ends 31 and 32 of slot 30. Spring 33 biases the striker into the engaged state. Portion 28' of pin 28 engages the trip mechanism as described below. Downward motion of pin 28 disengages the striker latch from the striker bar.

Arm 34 of torsion spring 35, mounted on shaft 36, drives the striker. Shaft 36 is supported in holes 37 and 38 in sides 13 and 21 respectively. Arm 39 of spring 35 contacts the top 40 of the tunnel.

Figure 3:
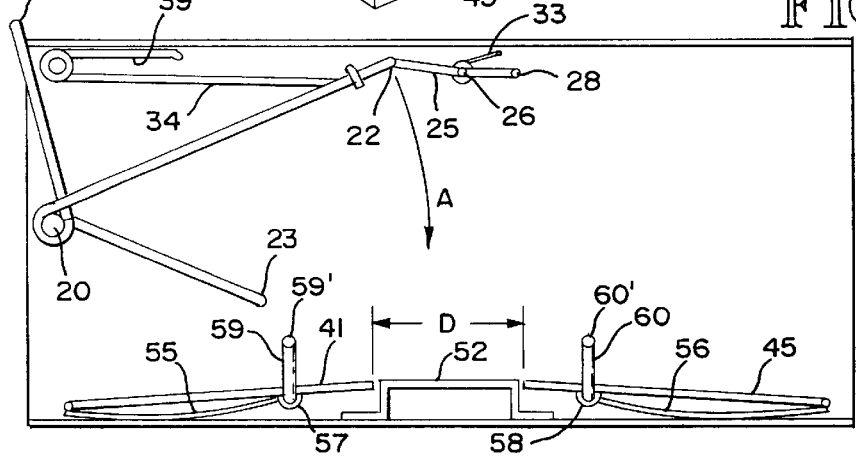
FIG. 3 is a schematic side view of FIG. 2.

Trip plate 41 is pivoted on the sides of the tunnel on rod 42 in holes 43 and 44. Trip plate 45 is also pivoted on the sides of the tunnel on rod 46 in holes 47 and 48. Holes 43, 44, 47 and 48 are close to the bottom 49 of the tunnel and ends 50 and 51 respectively. The plates are almost as wide as the tunnel and their lengths are equal and in a range of 0.3 to 0.5 of the tunnel length with 0.4 preferred. Channel 52 bridges the gap between ends 53 and 54 of the trip plates. Leaf springs 55 and 56, shown in FIG. 3, support trip plates 41 and 45 respectively.

The center line of channel 52 is midway between ends 50 and 51 of the tunnel. Distance D between the ends 53 and 54 of the trip plates is related to the size and physiques of the animals to be trapped, in this embodiment rats. D must be such that with a rat positioned with its forefeet applied to either trip plate end 53 or 54 as it crosses channel 52, the striker bar, traveling in arc A, will strike the rat somewhere between the base of its skull and the lower end of its lungs. For examples, rats of the *Rattus rattus* specie have body lengths in the range of 6½ inches to 8 inches long and for this specie the value for D is in a range of one inch to two inches with 1¼ inches preferred. Rats of the specie *Rattus norvegicus* have body lengths ranging from seven inches to 10 inches and for this specie the value for D is in a range of 1½ to 2½ inches with 1½ inches preferred. Distance D is symmetrical to the plane of action of the striker bar and is in a range of ⅛ to ¼ of the body length of the rats to be trapped.

Ends 57 and 58 of 55 and 56 springs engage trip plate rods 59 and 60 respectively. The rods are formed to extend through slots 61 and 62 respectively in side 13 and the motions of the trip plates are limited by contacts between the trip plate rods and slots 61 and 62. Portions 59' and 60' of the trip plate rods engage the trip mechanism as explained below.

FIG. 4 is a schematic illustration of the trip mechanism in the trip mechanism assembly. The mechanism comprises the trip plunger 16 having a shaft portion 63 which moves longitudinally in bearings 64 and 65. The plunger is urged downward by spring 66 mounted on pin 67 and having one arm 68 engaging pin 69 and another arm 70 engaging cross pin 71 on the plunger. Arm 72 extending laterally from the plunger engages end 28' of pin 28. Plunger latches 73 and 74 are holding the plunger up against the force applied by spring 66. The plunger latches are pivoted on pins 75 and 76 respectively. Arm 77 of latch 74 is engaged by end 59' of trip plate rod 59 and arm 78 of latch 73 is engaged by end 60' of trip plate rod 60.

The plunger latches are held engaged by arms 79 and 80 of springs 81 and 82 which are mounted on pins 83 and 84 respectively. Latch latches 85 and 86 are pivoted on pins 83 and 84 respectively and are urged in the engagement direction by arms 87 and 88 of springs 81 and 82 respectively.

FIG. 5 schematically illustrates the trip mechanism with plunger latch 73 disengaged from cross pin 89 at lower end 90 of plunger 63. The weight force applied by a rat to trip plate 45 has moved pin 60 down against the forces of springs 56 and 82. Latch latch 86 has engaged plunger latch 73, holding it in its release state. The plunger has not moved because it is still supported by plunger latch 74.

In FIG. 6 plunge latch 74 is also disengaged from cross pin 89 because the rat has continued moving through the tunnel and stepped onto trip plate 41, moving trip plate rod 59 downward to disengage the plunger latch. Latch 73 is latched in its release state by latch latch 85. The plunger has moved down under the force of spring 66, moving end 28' of pin 28 downward, activating the striker latch, and releasing the striker to strike the rat.

At this point, because the striker was not released until the rat had stepped with its forefeet onto a second trip plate, the rat is positioned so that it will be struck somewhere between the base of its skull and the rearward end of its lungs, depending on the size of the rat and the speed at which its was moving through the tunnel. For the trap to function in this way it must be in a range of 1.1 to 1.8 times as long as the average body length of the rats it is to trap with 1.5 preferred. When the trap is reset as described above, without touching the rat, the rat can be dumped out of the trap.

While the subject trap is termed a rat trap, it could obviously be used for other animals, squirrels for example. The springs under the trip plates can be provided in various widths and therefore force ranges, making the trap sensitive to the weight of animals entering it so that, for example, gray squirrels would not be trapped while red squirrels would.

In electromechanical embodiments the tripping may be done using trip plates 41 and 45 to operate switches to provide signals to electromechanical or electronic equipment which causes the striker to be released when conditions are appropriate (i.e. the rat is positioned to be struck in the vital zone) or other means can be used to sense when the rat is so positioned, all such means involving double tripping. Providing such means is considered to be within the capabilities of persons having ordinary skill in the art, the invention lying in the double tripping used in a tunnel trap.

Because the trap requires no bait it can be left set for extended periods of time. To avoid the need for routine checking of the trap it would be helpful to provide means for detecting and signaling function of the trap. Such means is known to be well within the capability of persons having ordinary skill in the art.

It is considered to be understandable from this description that the subject invention meets its objectives. It provides a bi-directional tunnel rat trap which reliably kills the trapped rat. Removal of the rat is simple and does not require handling of the rat. Setting the trip is simple and virtually risk free and does not require high finger strength or manual dexterity. Also, the trap is sensitive to the weight of animals passing through it.

It is also considered to be understood that while one embodiment of the invention is described herein, other embodiments and modifications of the one described are possible within the scope of the invention which is limited only by the attached claims.

I claim:

1. A bi-directional tunnel trap for trapping animals having a range of body lengths and having a striker comprising a striker bar, said striker bar moving in an arc, said trap further comprising a tripping mechanism, said tripping mechanism comprising a first trip plate and a second trip plate and being such that said trap is tripped when said first and second trip plates are actuated sequentially, said trip plates each having a first end and a second end, each of said first ends being pivoted in said trap, said mechanism further comprising springs to support said second ends, said second ends being supported on said springs and being disposed symmetrically relative to said arc.

2. The trap of claim 1 in which said second ends of said trip plates are a distance apart in a range of ⅛ to ¼ of said body lengths.

* * * * *